US008226787B2

(12) United States Patent
Benson et al.

(10) Patent No.: US 8,226,787 B2
(45) Date of Patent: *Jul. 24, 2012

(54) METHODS FOR FORMING COMPOSITE STIFFENERS AND REINFORCING STRUCTURES

(75) Inventors: Vernon M. Benson, Morgan, UT (US); Jason Slack, Clearfield, UT (US); Todd A. Rosevear, Taylorsville, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/831,759

(22) Filed: Jul. 31, 2007

(65) Prior Publication Data
US 2007/0289699 A1 Dec. 20, 2007

Related U.S. Application Data

(62) Division of application No. 10/633,025, filed on Aug. 1, 2003, now Pat. No. 7,249,943.

(51) Int. Cl.
*B29C 41/22* (2006.01)
(52) U.S. Cl. ........ 156/212; 156/214; 156/285; 264/250; 264/255; 264/241; 264/257; 264/294; 264/296; 264/299
(58) Field of Classification Search .................. 156/199, 156/200, 212, 214, 285, 582; 264/241, 257, 264/258, 294, 296, 299, 255, 250; 425/373, 425/374, 394, 500, 403
See application file for complete search history.

(56) References Cited

U.S. PATENT DOCUMENTS

| 1,452,742 A | 4/1923 | Johnston |
| 2,938,566 A | 5/1960 | Toulmin, Jr. |
| 2,979,431 A | 4/1961 | Perrault |
| 3,300,355 A | 1/1967 | Adams |
| 3,616,072 A | 10/1971 | Bostrom |
| 3,669,324 A | 6/1972 | Landoni |
| 3,962,394 A | 6/1976 | Hall |

(Continued)

FOREIGN PATENT DOCUMENTS

FR       1.554.899       1/1969

(Continued)

OTHER PUBLICATIONS

Composite Systems, Inc., PFE_Technology, http://www.compositemfg.com/PFE%20Technology.htm, 2003, 3 pages.

(Continued)

*Primary Examiner* — Christopher Schatz
(74) *Attorney, Agent, or Firm* — IPLM Group, P.A.

(57) ABSTRACT

Apparatuses, systems and methods for forming elongated composite structural members are provided. One disclosed method includes providing a substantially elongated mandrel having an exterior surface exhibiting a desired geometry. A plurality of plies of fiber material preimpregnated with a thermosetting resin are laid up and pressed onto the mandrel. Pressing the plies of material may include passing one or more rollers over the mandrel and over the plurality of plies along a length of the mandrel. The roller or rollers may be at least partially complementary in shape with the mandrel while maintaining the plies of material in a substantially uncured state during the pressing. The method may include sequentially passing a plurality of rollers over the mandrel and the plies of material. The method may also include configuring a first roller to partially complementarily engage the mandrel and configuring another roller to substantially fully complementarily engage the mandrel.

33 Claims, 15 Drawing Sheets

U.S. PATENT DOCUMENTS

| | | | |
|---|---|---|---|
| 3,995,080 A | | 11/1976 | Cogburn et al. |
| 3,995,081 A | | 11/1976 | Fant et al. |
| 4,151,031 A | * | 4/1979 | Goad et al. .................... 156/201 |
| 4,278,738 A | | 7/1981 | Brax et al. |
| 4,310,132 A | | 1/1982 | Frosch et al. |
| 4,357,193 A | | 11/1982 | McGann et al. |
| 4,410,383 A | | 10/1983 | Lipari |
| 4,475,976 A | | 10/1984 | Mittelstadt et al. |
| 4,519,285 A | * | 5/1985 | Dontscheff .................... 83/880 |
| 4,548,859 A | | 10/1985 | Kline et al. |
| 4,559,005 A | | 12/1985 | Gants et al. |
| 4,861,406 A | | 8/1989 | Baker et al. |
| 4,946,526 A | | 8/1990 | Petty-Galis et al. |
| 4,997,510 A | | 3/1991 | Shinno et al. |
| 5,026,447 A | | 6/1991 | O'Connor |
| 5,039,371 A | | 8/1991 | Cremens et al. |
| 5,043,128 A | | 8/1991 | Umeda |
| 5,076,873 A | | 12/1991 | Lowery |
| 5,076,880 A | | 12/1991 | Spengler et al. |
| 5,102,609 A | | 4/1992 | Miller et al. |
| 5,137,071 A | | 8/1992 | Ashton et al. |
| 5,151,236 A | | 9/1992 | Azzara et al. |
| 5,182,060 A | | 1/1993 | Berecz |
| 5,211,901 A | | 5/1993 | Fray |
| 5,292,475 A | | 3/1994 | Mead et al. |
| 5,451,377 A | | 9/1995 | Asher et al. |
| 5,484,277 A | | 1/1996 | Lindsay |
| 5,502,886 A | | 4/1996 | Jensen et al. |
| 5,538,589 A | | 7/1996 | Jensen et al. |
| 5,543,199 A | | 8/1996 | Fell |
| 5,609,806 A | | 3/1997 | Walsh et al. |
| 5,632,940 A | | 5/1997 | Whatley |
| 5,639,410 A | | 6/1997 | Amaike et al. |
| 5,681,513 A | | 10/1997 | Farley |
| 5,707,576 A | | 1/1998 | Asher |
| 5,738,749 A | | 4/1998 | Grimshaw et al. |
| 5,792,487 A | | 8/1998 | Wenning et al. |
| 5,820,804 A | | 10/1998 | Elmaleh |
| 5,882,462 A | | 3/1999 | Donecker et al. |
| 5,891,379 A | | 4/1999 | Bhattacharyya et al. |
| 5,954,917 A | | 9/1999 | Jackson et al. |
| 6,027,786 A | | 2/2000 | Ford |
| 6,071,458 A | | 6/2000 | Mossi |
| 6,114,012 A | * | 9/2000 | Amaoka et al. ............... 428/182 |
| 6,164,604 A | | 12/2000 | Cirino et al. |
| 6,355,133 B1 | | 3/2002 | Williams |
| 6,413,461 B1 | | 7/2002 | Kobayashi et al. |
| 6,432,236 B1 | | 8/2002 | Leemon et al. |
| 6,544,366 B2 | | 4/2003 | Hamilton et al. |
| 6,702,970 B2 | | 3/2004 | Klug |
| 6,743,127 B2 | | 6/2004 | Eggiman et al. |
| 7,175,795 B2 | | 2/2007 | Eberth et al. |
| 7,249,943 B2 | | 7/2007 | Benson et al. |
| 7,469,735 B2 | | 12/2008 | Brown et al. |
| 7,513,769 B2 | | 4/2009 | Benson et al. |
| 7,527,222 B2 | | 5/2009 | Biornstad et al. |
| 7,767,128 B2 | | 8/2010 | Benson et al. |
| 7,820,092 B2 | * | 10/2010 | Benson et al. ................ 264/258 |
| 7,824,171 B2 | | 11/2010 | Hanson et al. |
| 2001/0001409 A1 | | 5/2001 | Weight et al. |
| 2002/0144401 A1 | | 10/2002 | Nogueroles Vines et al. |
| 2003/0079825 A1 | | 5/2003 | Gardner et al. |
| 2006/0249868 A1 | | 11/2006 | Brown et al. |
| 2009/0044914 A1 | | 2/2009 | Pham et al. |
| 2009/0071592 A1 | | 3/2009 | Benson et al. |
| 2009/0078362 A1 | | 3/2009 | Wilkerson et al. |
| 2009/0081443 A1 | | 3/2009 | Benson et al. |
| 2009/0110879 A1 | | 4/2009 | Lewis et al. |
| 2009/0130450 A1 | | 5/2009 | Anderson et al. |
| 2009/0176066 A1 | | 7/2009 | Darrow et al. |
| 2011/0000311 A1 | | 1/2011 | Petroff |
| 2011/0003111 A1 | | 1/2011 | Benson et al. |
| 2011/0108189 A1 | | 5/2011 | Madsen et al. |

FOREIGN PATENT DOCUMENTS

| | | |
|---|---|---|
| JP | U-58-39845 | 9/1981 |
| JP | 62-119027 | 5/1987 |
| JP | 64-004315 | 9/1989 |
| JP | 04-062142 | 2/1992 |
| JP | 05-050571 | 3/1993 |
| JP | 10-315339 | 2/1998 |
| JP | 2008-184155 | 8/2008 |
| JP | 2008-184156 | 8/2008 |
| WO | 99/52698 | 10/1999 |
| WO | 00/37244 | 6/2000 |
| WO | WO 2005/011961 A1 | 2/2005 |
| WO | WO 2006/119002 A2 | 11/2006 |
| WO | WO 2007/018935 A1 | 2/2007 |
| WO | WO 2008/019894 A1 | 2/2008 |
| WO | WO 2009/049737 A1 | 4/2009 |
| WO | WO 2009/052598 A2 | 4/2009 |
| WO | WO 2009/088699 A1 | 7/2009 |

OTHER PUBLICATIONS

PCT International Search Report, Application No. PCT/US2004/024960, dated Dec. 13, 2004 (5 pages).

European Search Report, European Patent Application EP 101086688.7 Apr. 6, 2011.

Notice of Reason of Rejection. Japanese Office Action for Japanese Patent Application 2006-522662, mailed Jul. 16, 2009.

* cited by examiner

METHODS FOR FORMING COMPOSITE STIFFENERS AND REINFORCING STRUCTURES

CROSS-REFERENCE TO RELATED APPLICATION

This application is a divisional of application Ser. No. 10/633,025, filed Aug. 1, 2003, pending. The disclosure of the previously referenced U.S. patent application is hereby incorporated by reference in its entirety.

BACKGROUND OF THE INVENTION

1. Field of the Invention

The present invention relates generally to the formation of composite structures and, more particularly, to the formation of the stiffeners or other reinforcing members associated with such composite structures.

2. State of the Art

In the fabrication of composite structures, structural members are often attached to a skin to provide reinforcement of the skin. Such structural members may include, for example, ribs, spars or frames configured to be attached to the skin of the composite structures. Such structural members may also include substantially elongated stiffening members often referred to as stringers or stiffeners. The stringers or stiffeners may be formed to exhibit various cross-sectional geometries including configurations such as I-beams, C-shapes or channels, J-shapes, Z-shapes, L-shapes or angles, omega shapes or what is often referred to as a hat shape or a hat channel. A stiffener or stringer exhibiting a cross-sectional geometry or profile of a hat essentially includes a cap member having a pair of web members, one web member extending from each end of the cap member at a defined angle relative thereto, and a pair of flange members with one flange member extending from each web member at a defined angle relative to the associated web member. In the cross-sectional geometry of some hat stiffeners, the flange members may be configured to be substantially parallel with the cap member.

A current method of forming composite hat stiffeners, as well as stiffeners exhibiting other cross-sectional geometries, includes laying up composite plies by hand, one at a time, over a mold, mandrel or other similar tool to form a laminate structure. Upon laying up every two to three plies, the laminate structure needs to be compacted or debulked. This is conventionally accomplished by vacuum debulking wherein a vacuum bag is placed over the laminate structure and a vacuum applied to the structure by way of the bag. Often, heat may be applied to assist in the debulking process and in an attempt to further compact the laminate structure. Each vacuum debulk performed on the laminate structure represents a time-consuming process. In forming the laminate structure, multiple vacuum compactions may need to take place upon the building up of layers to form the laminate structure. However, even with multiple vacuum debulks being performed on a given laminate structure, the laminate structure may still undesirably exhibit a significant amount of bulk.

Once all of the plies have been positioned and the laminate structure has been initially formed (including the process of subjecting the laminate structure to vacuum debulking processes), the laminate structure may be cured and subsequently attached to a skin structure, such as with adhesive, or may be cocured (cured concurrently) with the skin structure, thereby bonding the two components together. Curing of the laminate structure is conventionally accomplished by placing the laminate structure in a cure mold and subjecting it to a high pressure and high temperature such as in an autoclave or similar environments When the laminate structures are placed in a cure mold, because they still exhibit a substantial amount of bulk, they may not fit properly within the mold. Furthermore, while any remaining bulk exhibited by the laminate structure tends to be driven out during the curing process, such as in an autoclave, there is little, if any, slip allowed between the plies of the laminate structure and, as a result, ply bridging and ply wrinkling will often occur within the cured or partially cured laminate structure.

While it is possible to obtain structure with low bulk characteristics by subjecting the structures to multiple hot debulks under autoclave pressure, such is a very time-consuming and expensive process. Additionally, such a process may shorten the working life of the laminate structure due to the repeated subjection thereof to high temperatures. Furthermore, such an aging process can hinder the ability of the laminate structure to be cocured with a mating skin or other structure.

In addition to the issues of obtaining a low bulk structure, the conventional process of forming composite reinforcing structures by hand has other limitations. For example, the method of forming elongated reinforcing structures by hand poses difficulties in obtaining shapes which, besides exhibiting a desired cross-sectional geometry, also exhibit bends along a longitudinal axis or twist about the longitudinal axis of the structure. Such features are difficult to accomplish, in part, because it is difficult to manipulate the plies by hand to conform to such bends and/or twists without introducing additional wrinkles or waves into the laminate structure being formed. Furthermore, the manipulation of plies by hand is an extremely time-consuming and labor-intensive process, thereby increasing the cost of manufacturing such parts.

Various attempts have been made to provide a process which provides elongated reinforcing structures without the various limitations which are presented by the conventional process of laying up individual composite plies by hand. For example, pultrusion is a process which has been used to form plastic materials, including fiber-reinforced plastic composite materials, into structures exhibiting a desired cross-sectional geometry or profile. An example of such a pultrusion process is set forth in U.S. Pat. No. 5,026,447 issued to O'Connor. O'Connor teaches the pulling of an elongated body of reinforced thermoplastic material through a plurality of dies. The dies are operated independently of each other such that any combination of the dies may be selected to impart a cross-sectional geometry to a portion of the elongated body. The process of O'Connor purportedly allows the manufacture of an elongated thermoplastic member which may exhibit varied cross-sectional geometries along the length thereof However, as will be recognized by those of ordinary skill in the art, there are various limitations associated with the process of pultrusion.

For example, pultrusion is conventionally associated with materials utilizing a thermoplastic resin. The use of thermosetting resins may cause a buildup of material on the dies and considerable inefficiencies in forming the desired cross-sectional shape of the pultruded member. Additionally, it is often difficult to obtain a fiber orientation in the resultant member which varies significantly from the longitudinal axis of the formed member (i.e., along the direction which the member is pulled through the die or dies). Furthermore, because the process involves forming the member by pulling a plurality of fibers through a die and then cooling the member until the resin substantially resolidifies, such a process is generally only effective for forming straight or linear members and may not be effective in forming members exhibiting a cross-section which does not vary substantially in terms of overall cross-sectional area. It is also noted that the dies used in pultrusion are generally expensive to manufacture and numerous dies are required if it is desired to produce elongated members of more than one cross-sectional geometry.

Other processes for forming elongated thermoplastic members include, for example, U.S. Pat. No. 5,891,379, issued to Bhattacharyya et al., and U.S. Pat. No. 5,182,060, issued to Berecz. Bhattacharyya discloses a process of forming fiber-reinforced plastic material into a desired shape which includes heating the material to a temperature above the melting temperature of the thermoplastic resin or matrix material. The heated material is cooled below the melting temperature but still maintained at a temperature which is above the recrystallization temperature of the thermoplastic material, and then passed through a plurality of roll-forming dies in order to produce a desired shape. The shaped material is then further cooled so that the fiber-reinforced plastic material will retain the shape imposed thereto by roll-forming dies. Berecz discloses a process of continuously forming a thermoplastic composite shape including heating the unidirectional tape or woven cloth, passing the heated material through a set of rollers, and then passing the heated material through a matched metal die which acts as a rapidly reciprocating punch to form the final shape.

While the processes taught by Bhattacharyya and Berecz appear to allow improved control of the fiber orientation in the resultant part over a conventional pultrusion process, the disclosed processes appear to be limited to the use of materials comprising thermoplastic resins including subjecting the materials to temperatures at or above melting temperatures of the resin prior to forming the desired cross-sectional geometries. As will be appreciated by those of ordinary skill in the art, the use of thermoplastic resins provides considerable flexibility in being able to melt, or substantially melt, the resin and subsequently reheat the resin in order to reshape/rework the member and/or to adhere the member to another structure by means of contacting the other structure with the melted or substantially melted resin material.

However, such a process is not amenable to the formation of reinforcing or structural members comprising thermosetting materials since, if the thermosetting resin is heated above a specified temperature to allow the resin to readily flow and thereby assist in forming the composite material into a specified cross-sectional geometry, the thermosetting resin will cross-link and cure. Once the reinforcing member is cured, it will not be possible to perform any subsequent rework of the member, nor will the member be able to be bonded to another structure through cocuring.

For example, U.S. Pat. No. 5,043,128 to Umeda discloses a process of forming an elongated composite member utilizing a thermosetting resin which includes feeding a plurality of preimpregnated carbon fiber sheets of material through a pair of shaping rollers and into a heating and press forming device. The heating and press forming device includes a heating die and a press punch configured to engage the heating die. The sheets of material are temporarily stopped within the heating and press forming device and pressed by the punch against the heating die. The sheets of material are, thus, simultaneously pressed and heated, resulting in the thermosetting, or curing, of the sheets of material into the desired shape. As noted above, a process of forming a structural member which includes the curing of a thermosetting resin prevents any subsequent reworking of the member and/or any cocuring of the structural member with, for example, a composite skin or other structural member. Thus, in order to form a structural member exhibiting a desired cross-sectional geometry from a composite material comprising a thermosetting resin which is not fully cured, methods such as that described above wherein multiple plies are laid up by hand over a mandrel or mold are still utilized.

In view of the shortcomings in the art, it would be advantageous to provide an apparatus and a method for forming elongated reinforcing or structural members of a material comprising a thermosetting resin which enables the member to exhibit a desired cross-sectional geometry without fully curing the member.

BRIEF SUMMARY OF THE INVENTION

In accordance with one aspect of the invention, a method of forming an elongated composite structural member is provided. The method includes providing a substantially elongated mandrel having an exterior surface exhibiting a desired geometry. A plurality of plies of fiber material preimpregnated with a thermosetting resin is laid up on the mandrel. The plurality of plies is pressed onto the mandrel such as by passing at least one roller over the mandrel and the plurality of plies along a length of the mandrel. The at least one roller is configured to be at least partially complementary in shape with the mandrel. The plurality of plies is maintained in a substantially uncured state so that they may be subsequently cured or cocured with another composite structure.

In accordance with another aspect of the invention, a method of forming an elongated composite structural member is provided. The method includes laying up a plurality of plies of composite material onto an elongated mandrel having a surface exhibiting a desired geometry. A portion of the plurality of plies is substantially simultaneously pressed onto and formed over the mandrel to at least partially conform the plurality of plies to the geometry of the mandrel. The plurality of plies is maintained in a substantially uncured state so that they may be subsequently cured or cocured with another composite structure.

In accordance with yet another aspect of the present invention, an apparatus for forming elongated composite structural members is provided. The apparatus includes a base and at least one mandrel mounted on the base, the at least one mandrel exhibiting a substantially elongated geometry. A carriage assembly is movably coupled to the base. At least one roller, exhibiting a geometry configured to at least partially complementarily engage the least one mandrel as it rolls therealong, is coupled with the carriage assembly. At least one force-applying mechanism is configured to apply a desired force to the mandrel through the at least one roller.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
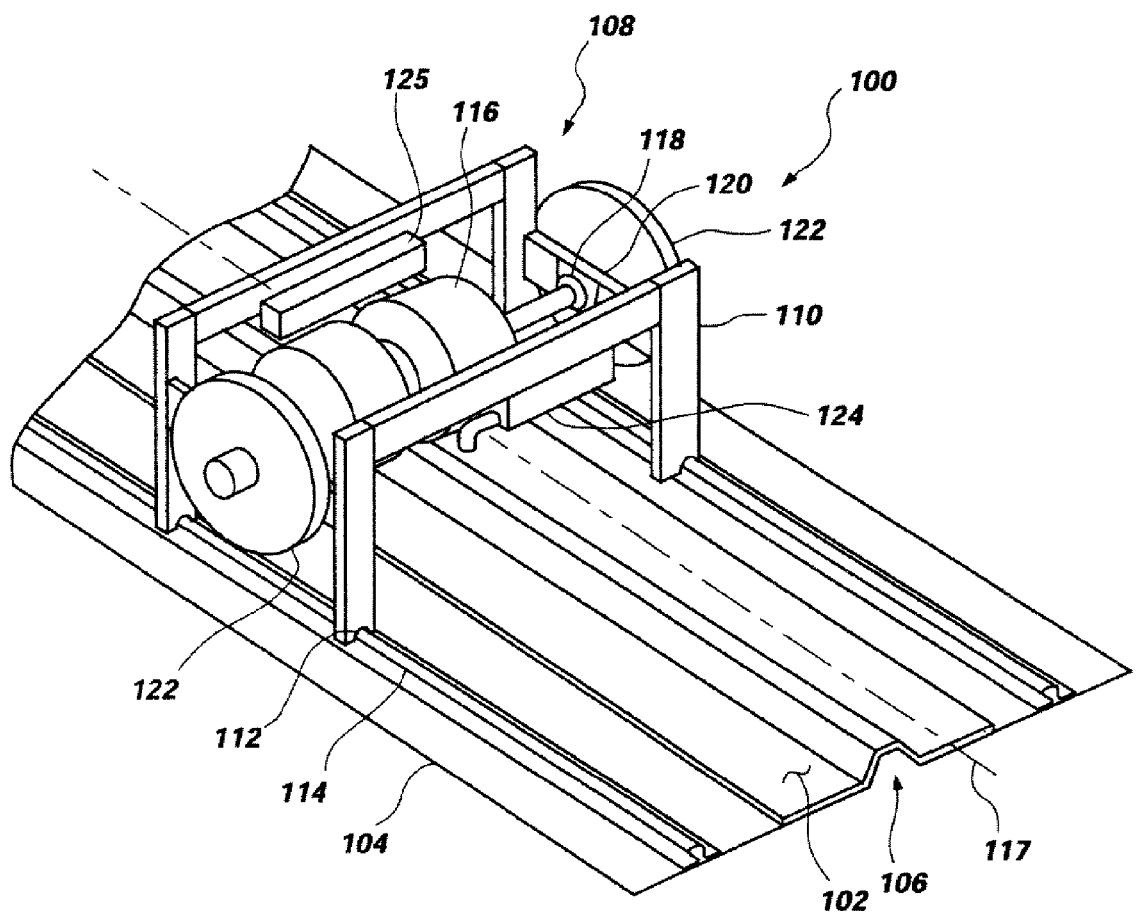
FIG. 1 is a perspective view of an apparatus for forming elongated composite members in accordance with an embodiment of the invention.

Referring to FIG. 1 an apparatus 100 is shown for forming elongated structural or reinforcing members 102 (referred to herein for simplicity as elongated members), such as stiffeners or stringers, using composite materials including, for example, carbon fiber-reinforced materials and thermosetting resins. The apparatus 100 includes a base 104 having a portion thereof configured as a molding member such as a mandrel 106. A carriage assembly 108, including a frame 110, is movably coupled with the base 104 such as, for example, with rollers or slides 112 positioned within corresponding track members 114. The rollers or slides 112 in conjunction with the track members 114 allow the carriage assembly 108 to move along a longitudinally defined axis 117 relative to the base 104 in forming the elongated member 102 as shall be described in greater detail hereinbelow.

The carriage assembly 108 further includes a rolling member 116, also referred to herein as a roller, configured to be at least partially complementary with, and positioned over, the mandrel 106. The roller 116 may be removably coupled with the carriage assembly 108 such that other rollers may be interchanged therewith at various stages of forming the elongated member 102 or for forming elongated members with differing cross-sectional geometries. The roller 116 may be coupled to the carriage assembly 108 by way of a suitable bearing member 118 allowing the roller 116 to turn or roll when engaged with the base 104 and when the carriage assembly 108 is moving relative thereto. The roller 116 may be formed of, or coated with, for example, an elastomer material, such as, for example, polytetrafluorethylene (PTFE), for purposes of conforming the roller to the surface of, and more evenly distributing forces over, the laminate materials being used to form the elongated member 102 as the roller 116 passes thereover.

The frame 110 of the carriage assembly 108 may desirably be configured such that the roller 116 is substantially vertically displaceable or adjustable relative to the base 104. For example, a portion of the frame 110, such as a cross-member 120, may be vertically displaceable relative to the main portion of the frame 110. The carriage assembly 108 is also configured to exert a generally downward force on the base 104 and, thus, the elongated member 102, by way of the roller 116. Various mechanisms may be used to exert such a force. For example, as illustrated in FIG. 1, one or more weights 122 may be coupled to the carriage assembly 108 and, more particularly, to the cross-member 120 such that the weights exert a downward force through the roller 116 which is coupled with such cross-members 120. In another embodiment, an actuator, such as a hydraulic or pneumatic cylinder, may be coupled to the frame 110 and configured to exert a substantially downward force upon the cross-member 120 or some other component such that a pressure may be applied by the roller 116 to the mandrel 106.

The carriage assembly 108 may also include a heating apparatus 124 configured to heat a portion of the elongated member 102 prior to the roller 116 passing thereover. The heating apparatus 124 may include, for example, a resistive heater with an associated blower, an infrared heater, an ultrasonic heating device, a laser heating device, an electron beam heater or another appropriate heating device. In one embodiment, the heating device may be configured and located to heat the mandrel 106 and/or the roller 116. In another embodiment, the heating apparatus 124 may be configured and oriented to heat a portion of the elongated member 102 and, more particularly, a portion of the plurality of composite material sheets laid down on the mandrel 106 to form the resulting elongated member 102 as shall be discussed in greater detail below. Such a heating apparatus 124 may be particularly useful in forming elongated members from pre-impregnated or "prepreg" materials. Such prepreg materials generally include unidirectional tape or cloth material impregnated with a resin in a B-stage form (uncured). The application of heat to such prepreg materials may enable the material sheets to more readily conform to the shape of the mandrel 106 and, more importantly, helps to effect consolidation of the laminar structure, including multiple overlaying sheets of material, which is formed on the mandrel 106.

It is noted that the application of heat could be used to cure the elongated member 102 upon formation thereof ("cure-on-the-fly"). However, the present invention also contemplates the ability to form an elongated member 102 which is substantially uncured. In other words, the present invention includes forming elongated members which are not significantly cured beyond the B-stage of a conventional prepreg material. The ability to form uncured components provides for substantial flexibility in forming and manufacturing a composite structure including the ability to cocure the elongated members with a corresponding composite skin as is often desirable.

A cooling device 125 may also be coupled to the carriage assembly 108 to cool the elongated member 102, the roller 116, or some other tool or component associated with the apparatus 100. The cooling device 125 may include, for example, a vortex cooler, a system for circulating a cooling fluid through an interior portion of the roller 116, a cryogenic cooler, or a multiple-phase system utilizing a condenser and evaporator.

Figure 2:
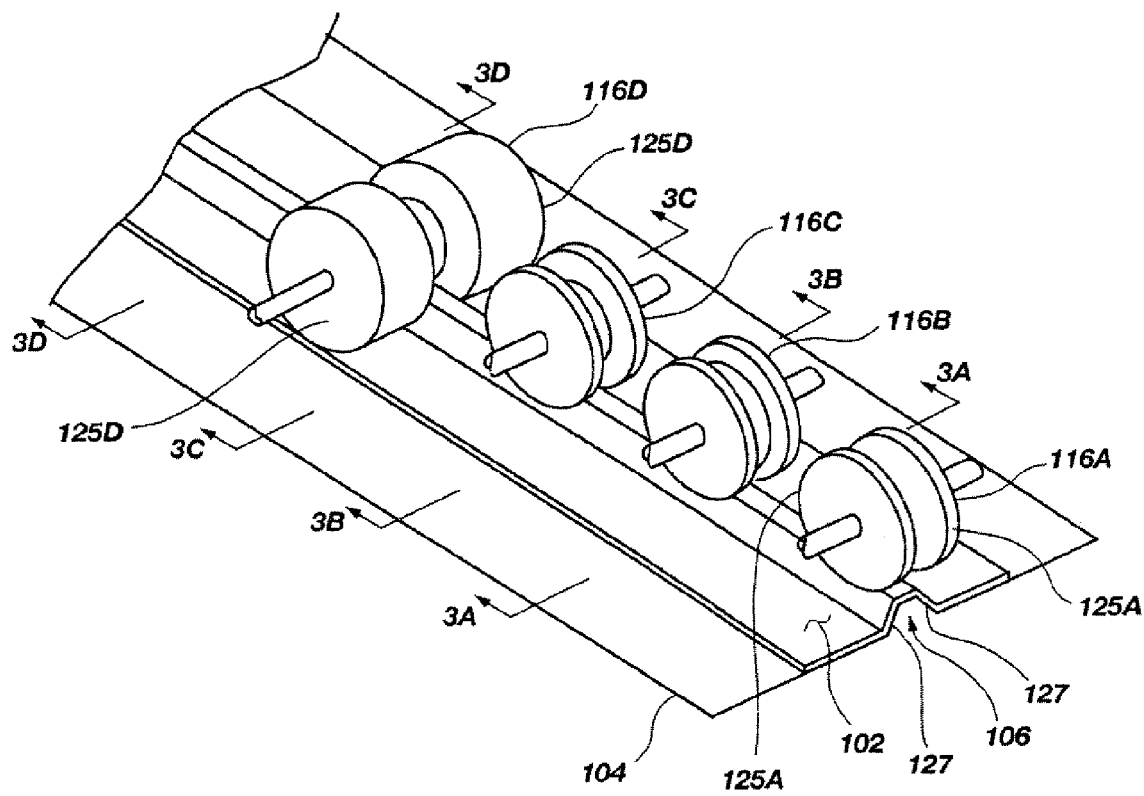
FIG. 2 is a perspective view of a portion of the apparatus of FIG. 1 in accordance with an embodiment of the present invention.

Referring now to FIG. 2 and FIGS. 3A-3D in conjunction with FIG. 1, the formation of an elongated member 102 is illustrated. In FIG. 2, the base 104 and mandrel 106 are shown without the carriage assembly 108 for purposes of clarity and convenience. FIG. 2 also shows a plurality of rollers 116A-116D engaging the elongated member 102 and associated mandrel 106 in at least a partially complementary manner. It is noted that if the particular apparatus 100 shown and described with respect to FIG. 1 is used, each roller 116A-116D may be individually coupled with e carriage assembly 108 and engaged with the elongated member 102 and mandrel 106. In other words, a first roller 116A may first be utilized with the carriage assembly 108 and then removed and replaced with a second roller 116B. The rollers 116A-116D may be sequentially and progressively interchanged to effect intermediate steps of formation of the elongated member 102.

Figure 3A:
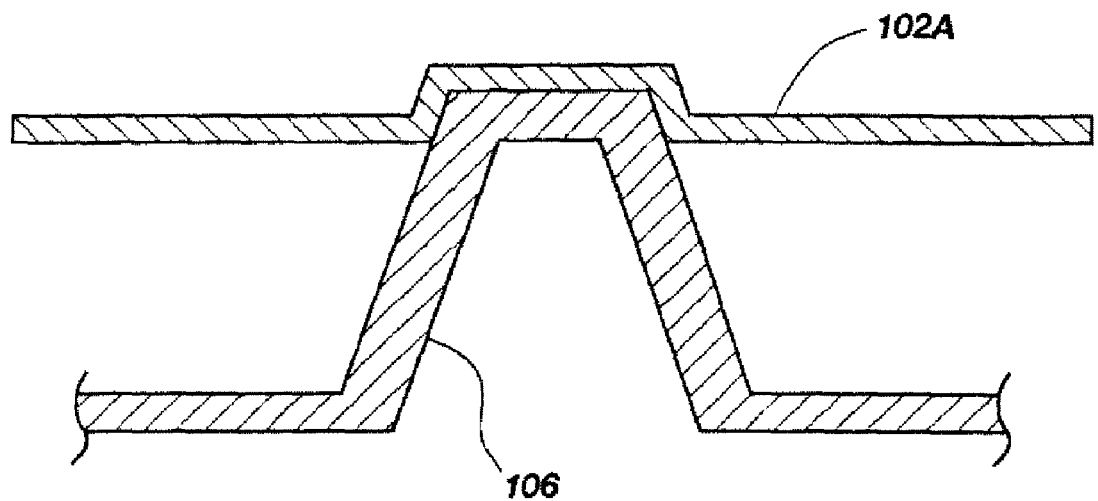
FIGS. 3A-3D show partial cross-sectional views of the apparatus of FIG. 1 during various stages of forming an elongated member therewith.
Figure 3B:
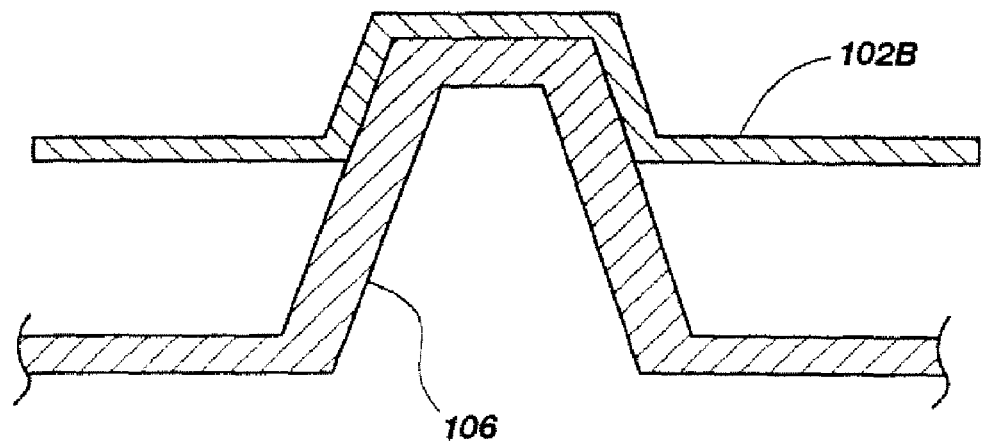
Figure 3C:
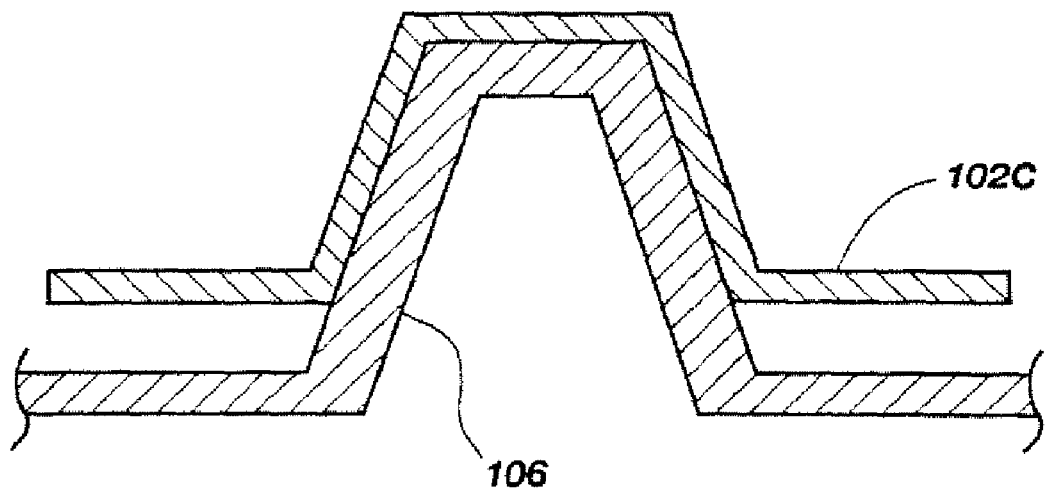
Figure 3D:
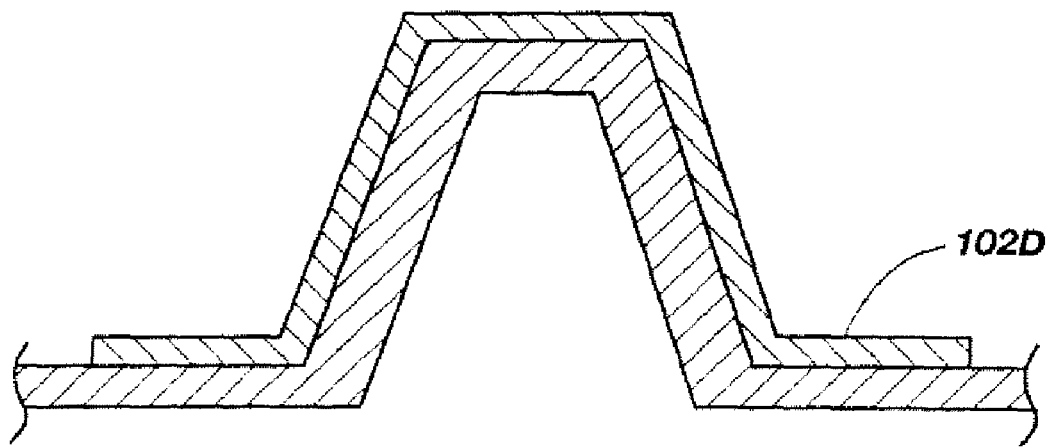

For example, in forming an elongated member 102, plies of material (e.g., prepreg material) may be positioned on the mandrel 106, and upon one another, in a laminar manner. The first roller 116A may then be coupled to the carriage assembly 108, configured to engage the mandrel 106 and rolled along the base 104 to form an intermediate structure 102A, or a structure exhibiting an intermediate cross-sectional geometry taken substantially transverse to the length thereof such as is shown in FIG. 3A. The first roller 116A may then be removed from the carriage assembly 108 and the second roller 116B may be coupled therewith. The second roller 116B engages the mandrel 106 and, as the carriage assembly 108 moves relative to the base 104, applies a rolling pressure to the first intermediate structure 102A to effect the formation of a second intermediate structure 102B, such as is shown in FIG. 3B. Similarly, the third roller 116C may be used to form a third intermediate structure 102C and the fourth roller 116D may be used to form the final structure 102D, or the structure exhibiting the final desired cross-sectional geometry as taken substantially transverse to the length of the elongated member.

The use of multiple rollers 116A-116D in sequentially forming intermediate structures 102A-102C and, ultimately, the final structure 102D enables manipulation of the material (e.g., the prepreg plies) while imposing a relatively reduced amount of stress thereto than if the elongated member was formed in a single operation or a single pass of a roller. Perhaps more importantly, the multiple layers of, for example, prepreg material used to form the elongated member become substantially consolidated and debulked during the formation of the intermediate structures 102A-102C.

It is noted that more or fewer rollers may be used in forming the elongated members 102 depending, for example, on the type of material being used, the number of plies or layers of material being utilized to form the elongated member 102, and/or the desired cross-sectional shape of the resulting elongated member 102. Similarly, the incremental change in roller size may be adjusted depending on similar parameters.

It is also noted that, in forming intermediate structures, the rollers 116A-116D are progressive in their respective geometries. In other words, the first roller 116A only partially engages the mandrel and material laid thereover in that the outer sections 125A only extend partially down the sidewalls 127 of the complementary mandrel 106. The second roller 116B, while still only partially engaging the mandrel 106, does so more than did the first roller 116A. Similarly, the third roller 116C is configured to more fully engage the mandrel 106 than does the second roller 116B. Finally, the fourth roller 116D is configured to substantially fully engage the mandrel 106 such that its outer sections 125D extend fully down the sidewalls 127 of the mandrel 106.

Figure 4:
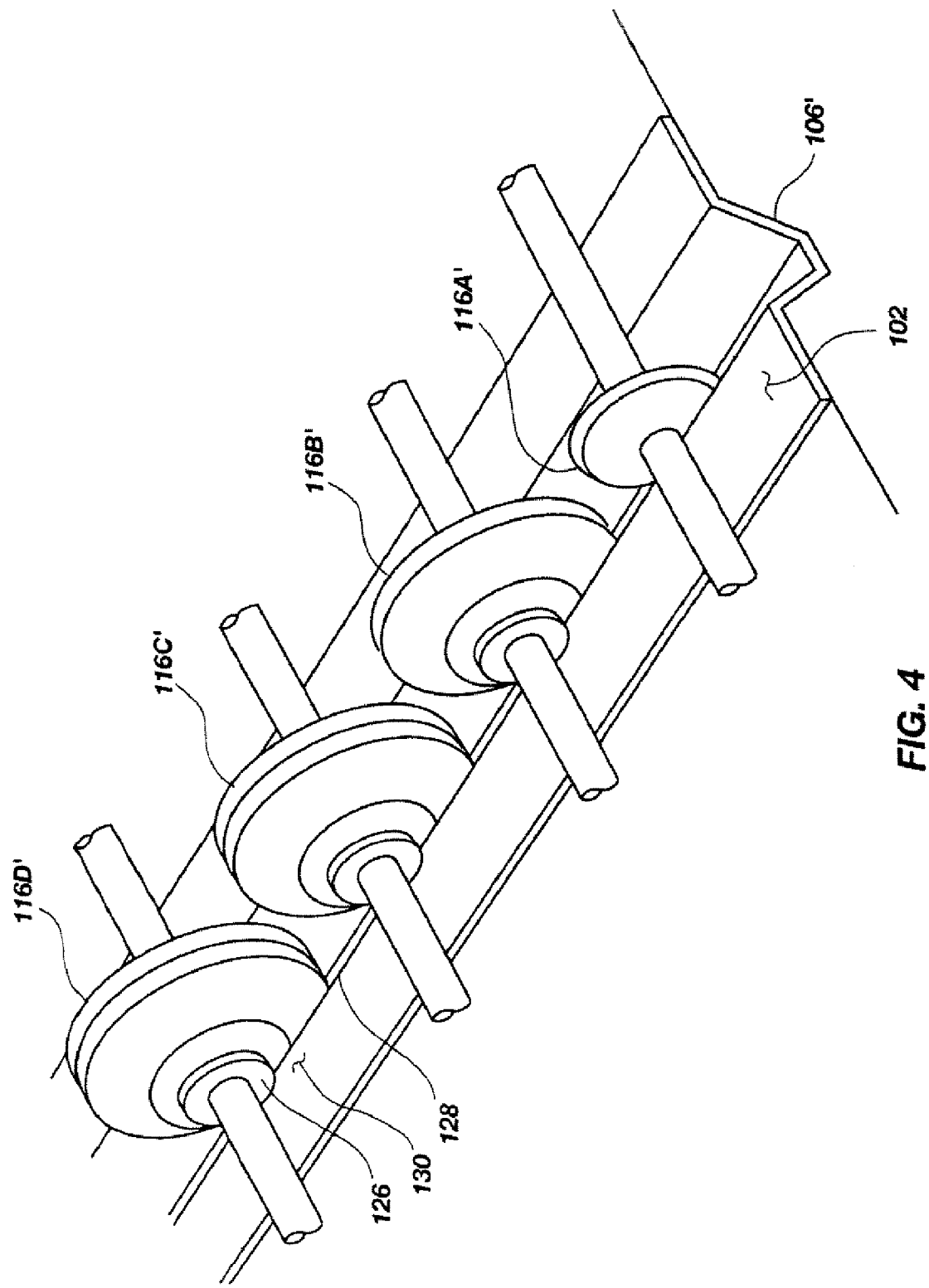
FIG. 4 is a perspective view of a portion of the apparatus of FIG. 1 in accordance with another embodiment of the present invention.

The embodiment shown and described with respect to FIGS. 1, 2 and 3A-3C include a male mandrel 106 and rollers 116A-116D which exhibit a complementary female geometry. However, in another embodiment, such as is shown in FIG. 4, a female mandrel 106' may be utilized with a plurality of complementary male rollers 116A'-116D' wherein the rollers 116A'-116D' press the composite material into the mandrel 106' to form the elongated member 102. As with the previously described embodiment, the rollers 116A'-116C' may be sequentially and progressively used to form intermediate structures with the fourth or last roller 116D' being used to impose the final cross-sectional geometry to the elongated member 102. One or more of the rollers 116A'-116D' may include laterally extended, reduced-diameter sections 126 to help form the upper corners 128 and the flags 130 or laterally extending portions of the elongated member 102.

Figure 5:
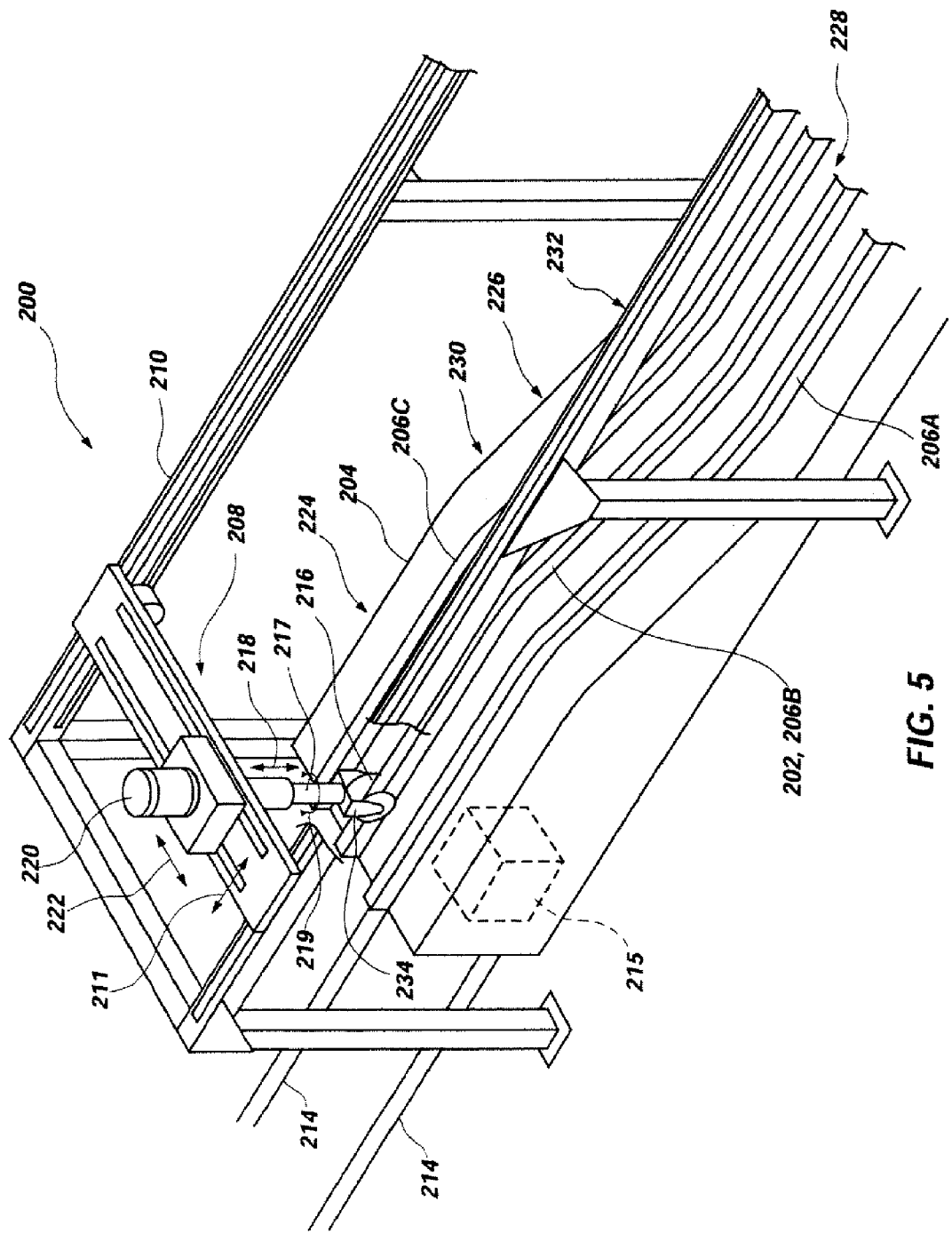
FIG. 5 is a perspective view of another apparatus for forming elongated composite members in accordance with another embodiment of the present invention.

Referring now to FIG. 5, an apparatus 200 for forming an elongated member 202 is shown in accordance with another embodiment of the present invention. The apparatus 200 includes a movable base 204 having a plurality of mandrels 206A-206C. A carriage assembly 208 is movably coupled with a stationary gantry 210. The carriage assembly 208 is configured to horizontally travel along the gantry 210 as indicated by directional arrow 211. The base 204 is also configured to travel along tracks 214 relative to both the gantry 210 and the carriage assembly 208. The base 204 may be motivated along the tracks 214 by an appropriate drive mechanism 215 such as a motor and gear box. The movement of the base 204 along the tracks 214 enables various tools (i.e., bases of other configurations) to be introduced beneath the gantry 210 from either end thereof.

A roller 216, configured to complementarily engage one or more of the mandrels 206A-206C, may be removably coupled to the carriage assembly 208 and may be coupled to an actuator 217 such that the roller 216 may be moved in the substantially vertical direction as indicated by directional arrow 218. The roller 216 may also be configured to swivel or rotate about a substantially vertical axis as indicated by directional arrow 219. The rotation of the roller 216 about the substantially vertical axis may be accomplished, for example, by allowing the roller 216 to freely swivel such that it generally follows the mandrel (e.g., 206B) with which it is engaged as the carriage assembly 208 moves in direction 211. In another embodiment, an actuator may be used to motivate the roller 216 about the substantially vertical axis as may be desired.

A drive mechanism 220 may be configured to move the roller 216 and its associated actuator 217 laterally with respect to the base 204 and the gantry 210 as indicated by directional arrow 222. The ability to control the movement of the carriage assembly 208 relative to the base 204 allows considerable flexibility in forming elongated members 202. For example, the same roller 216 may be used to selectively and independently engage each of the plurality of mandrels 206A-206C.

Additionally, the elongated members 202 may be formed as relatively complex shapes, not only with respect to their cross-sectional geometries, but also with respect to their geometries along a defined longitudinal axis. For example, the base 204 of the presently described apparatus includes a first relatively flat section 224, a sloped section 226, and a second relatively flat section 228 with the sloped section 226 being connected to adjacent flat sections 224 and 228 by curved transition sections 230 and 232. The mandrels 206A-206C generally comply with the contour or geometry of the base 204. Thus, as the carriage assembly 208 travels longitudinally as indicated by directional arrow 211, the roller 216 must vertically extend and retract as indicated by directional arrow 218 in order to remain engaged with a corresponding mandrel (e.g., 206B).

In other embodiments, the mandrels 206A-206C may deviate laterally relative to the longitudinal direction of the base 204 (i.e., in the direction indicated by directional arrow 222). Such complex geometries may be accommodated by the present invention through the various degrees of freedom offered by the arrangement shown. It is noted that, in one embodiment, the roller 216 may be coupled to a wrist 234 which allows the axis upon which the roller 216 rotates to be varied. Thus, the roller 216 may be able to remain in substantial contact with a mandrel (e.g., 206B) even if the mandrel exhibits a twist or rotation relative its longitudinal axis, thereby enabling the formation of elongated members 202 exhibiting a similar twist relative to their respective longitudinal axes.

In forming elongated members 202 with the above-described apparatus 200, the roller may be operated in a manner similar to that described above with respect to FIGS. 1, 2, 3A-3C and 4. In other words, intermediate structures may be formed by using a plurality of staged rollers (e.g., rollers which progressively change in shape to progressively engage the associated mandrels 206A-206C). Additionally, the mandrels 206A-206C may be either male or female components and the corresponding rollers 216 formed to complement such mandrels as necessary or desired.

Figure 6:
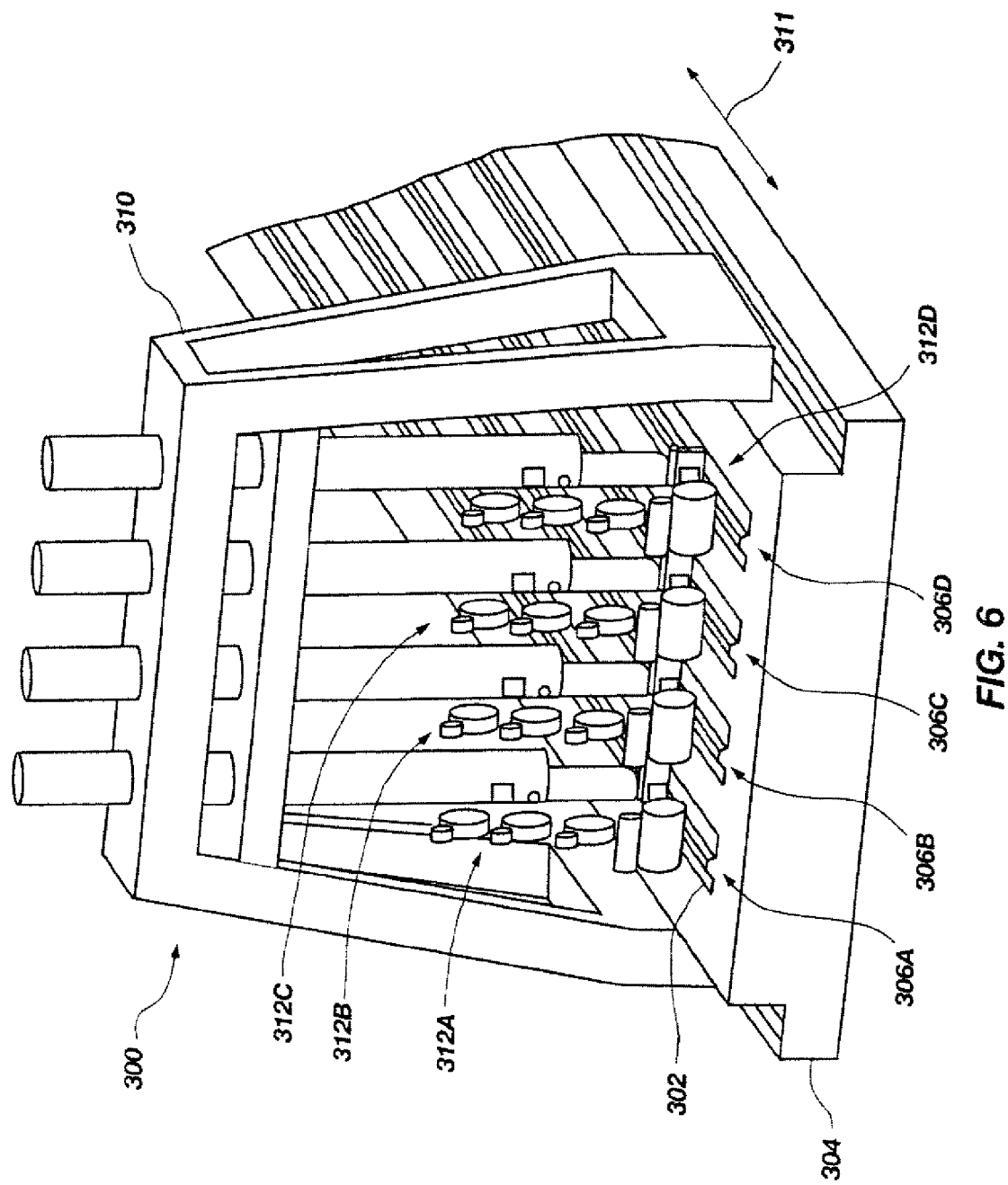
FIG. 6 is a perspective view of another apparatus for forming elongated composite members in accordance with yet another embodiment of the present invention.

Referring now to FIG. 6, an apparatus 300 for forming elongated members 302 is shown in accordance with another embodiment of the present invention. The apparatus 300 includes a base 304 having a plurality of mandrels 306A-306D mounted or located thereon. A positionable gantry 310 (or carriage assembly) is movably coupled with the base 30 and configured to move, for example, in a longitudinal direction as indicated by directional arrow 311 relative to the base 304. Associated with each mandrel 306A-306D is a device 312A-312D for laying up and forming a plurality of plies of composite material thereon. The devices 312A-312D may each include an automated material-dispensing device configured to dispense, for example, plies of cloth or tape material, and one or more rollers for forming the plies of composite material into a desired cross-sectional geometry. Such an automated dispensing device may include cut, clamp and start mechanisms such that individual plies may be dropped and added on the fly as desired or required depending on the configuration of the elongated member 302 being formed.

Each device 312A-312D may further include associated actuators or drive mechanisms in order to move the devices 312A-312D relative to the base 304 and to apply pressure via an associated roller to any material laid up on the mandrels 306A-306D. Each device 312-312D may be programmed to form identical stiffeners or different stiffeners depending on the individual configuration of the mandrels 306A-306D mounted on the base 304.

Figure 7:
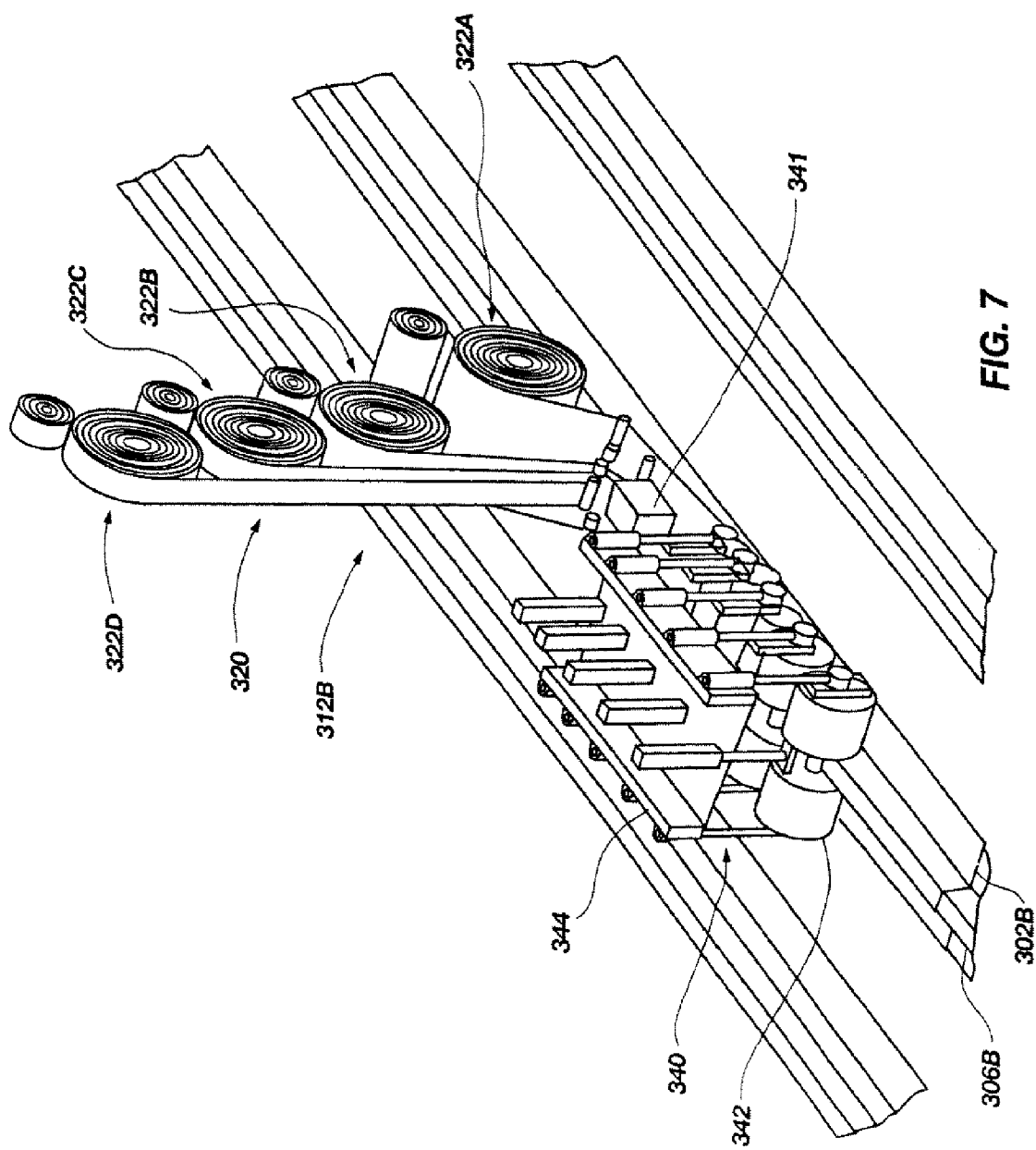
FIG. 7 is an enlarged perspective view of a portion of the apparatus shown in FIG. 6.

Referring to FIG. 7, an individual device 312B is shown positioned above its corresponding mandrel 306B without the associated gantry 310 (FIG. 6) for clarity in describing the operation of the device 312B. The device 312B includes an automated material dispenser 320 including a plurality of ply dispensers 322A-322D for dispensing and laying up plies of composite material onto the mandrel 306B. It is noted that the ply dispensers 322A-322D may be configured to dispense plies of composite material, such as prepreg tape or cloth, which vary in width. Using such varied-width plies of material, the elongated member 302B may be configured such that it exhibits a greater thickness (i.e., by inclusion of more plies) in one portion of the elongated 302B member than another.

For example, referring briefly to FIG. 5A in conjunction with FIG. 7, the first ply dispenser 322A may be configured to dispense a ply 330A which extends throughout the entire "width" or extent of the cross-sectional geometry of the elongated member 302B. Another ply dispenser 322C may dispense a ply 330C which only extends across the upper lateral portion 332 (e.g., the cap) of the cross-sectional geometry of the elongated member 302B. Thus, the elongated member 302B may be designed and tailored with respect to ply or material placement in accordance with expected loadings and applied stresses by increasing or reducing the effective number of plies in a given section or portion thereof Additionally, it is noted that the individual plies of material may be configured to exhibit substantially any desired fiber orientation (or orientations) as may be needed in accordance with expected loadings and stress states of the elongated member 302B. Such is a significant advantage over other forming processes such as pultrusion.

Figure 8A:
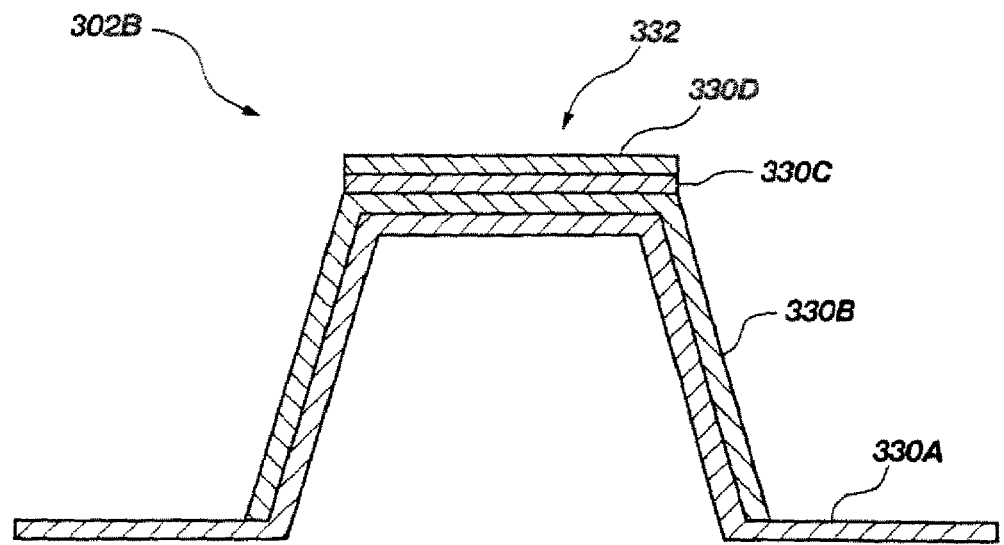
FIGS. 8A and 8B show cross-sectional views of elongated reinforcing members formed in accordance with various aspects of the present invention and at various stages of manufacture.
Figure 8B:
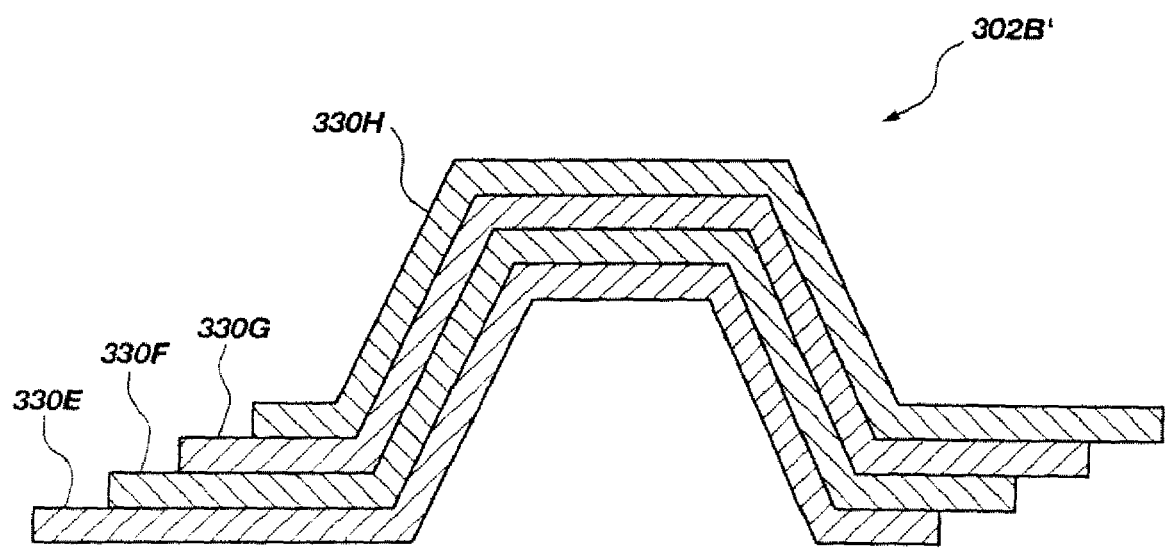

Referring briefly to FIG. 8B in conjunction with FIG, 7, another embodiment may include plies 330E-330H which exhibit similar widths to one another but which are staggered or laterally displaced relative to one another. The resulting elongated member 302B' thus has a step-like configuration on one lateral side thereof and a reversed image of the step-like configuration on the opposing lateral side thereof. Such a configuration enables the interlocking of multiple elongated members 302B' in a side-by-side relationship if so desired. The staggered or step-like configuration may be formed through appropriate control of the ply dispensers 322A-322D such as, for example, by laterally displacing one ply dispenser (e.g., 322A) relative to another (e.g., 322B).

In another embodiment, one or more edge ply cutting devices 341 may be utilized to trim the edge (or edges) of any ply 330A-330H (FIGS. 8A and 8B) dispensed over an associated mandrel 306A-306D. Such a cutting device 341 may include a knife, a rolling blade, a laser, or other appropriate cutting means configured to trim the edge of a ply 330A at a desired width or lateral position as the gantry (not shown in FIG. 7) moves longitudinally relative to a mandrel 306A-306C.

Still referring to FIG. 7, the individual device 312B also includes a forming device 340. The forming device 340 may include a plurality of rollers 342 configured to at least partially complementarily engage with the mandrel 306B and thereby sequentially form, in a substantially continuous manner, the desired cross-sectional geometry of the elongated member 302B. The rollers 342 may be individually coupled to one of a plurality of actuators 344 such as, for example, hydraulic or pneumatic cylinders, so that pressure may be applied through the rollers as they pass over the plurality of plies of material laid upon the mandrel 306B. Thus, rather than interchanging rollers which pass over an associated mandrel in individual passes, such as described above with respect other embodiments, the plurality of rollers 342 may be combined in a single unit to immediately follow one another along the mandrel 306B during a single pass to form the desired cross-sectional geometry.

Figure 9:
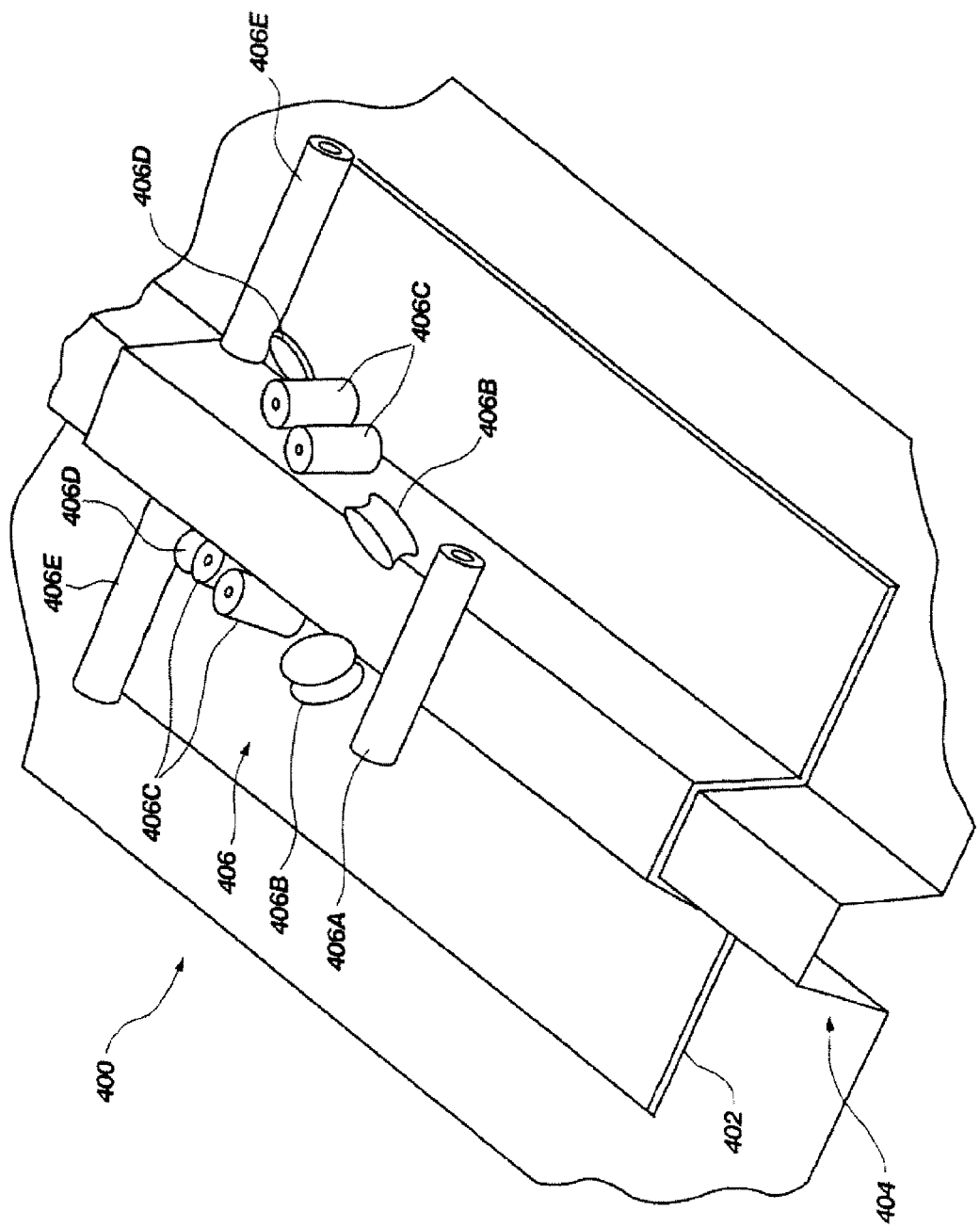
FIG. 9 is a perspective view of an apparatus for forming elongated composite members in accordance with a further embodiment of the present invention.

Referring now to FIG. 9, an apparatus 400 for forming elongated members 402 is shown in accordance with yet another embodiment of the present invention. While not shown for purposes of convenience and clarity, the apparatus 400 may include various components, such as described above, including a base, a gantry, and/or a carriage assembly which are relatively movable with respect to each other. The apparatus may also include, for example, an automated material-dispensing device for laying a plurality of plies of composite material onto the mandrel 404.

The apparatus 400 includes a plurality of rollers 406 which are each configured to engage a specific portion of the male mandrel 404 (or the material plies laying thereover) in order to form a desired cross-sectional geometry. For example, a first roller 406A may be configured to press the plies of material onto the top surface of the male mandrel 404. One set of rollers 406B may be configured to form the plies of material about the exterior corners of the male mandrel 404. Another set of rollers 406C may be configured to press the plies of material against the sides of the male mandrel 404. A further set of rollers 406D may be configured to press the plies of material into the interior corners of the male mandrel 404, and a final set of rollers 406E may be configured to press the plies of material against the laterally extending portions of the male mandrel 404. Thus, the plurality of rollers 406 work collectively to substantially continuously form an elongated member 402 of a desired cross-sectional geometry over the male mandrel 404.

Figure 10:
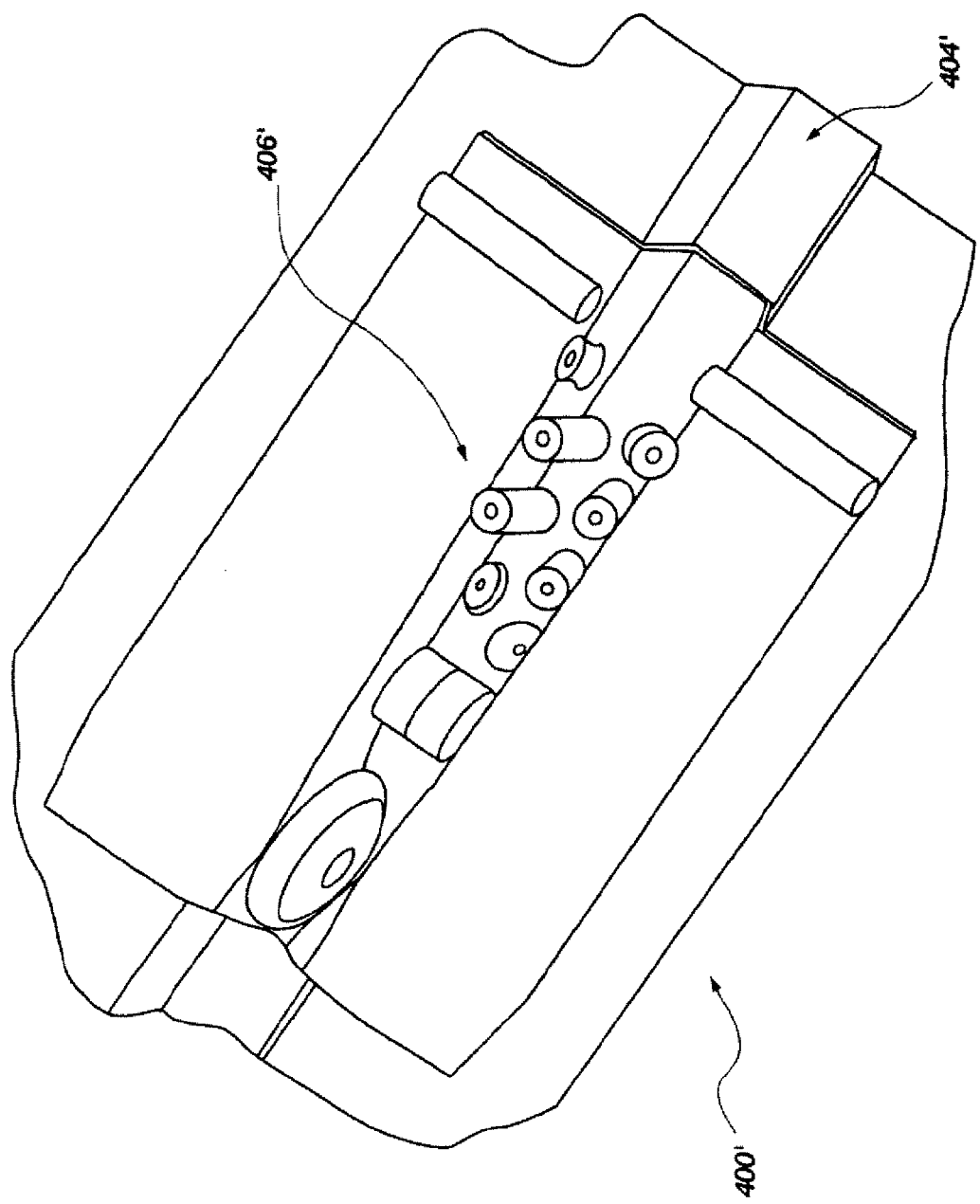
FIG. 10 is a perspective view of an apparatus for forming elongated composite members in accordance with yet a further embodiment of the present invention.

Referring briefly to FIG. 10, another embodiment of the apparatus 400' is shown, similar to that shown and described with respect to FIG. 9, except that the mandrel 404' is configured as a female mandrel and the rollers 406' are configured to engage specifically identified portions thereof in order to form the elongated member 402.

Figure 11:
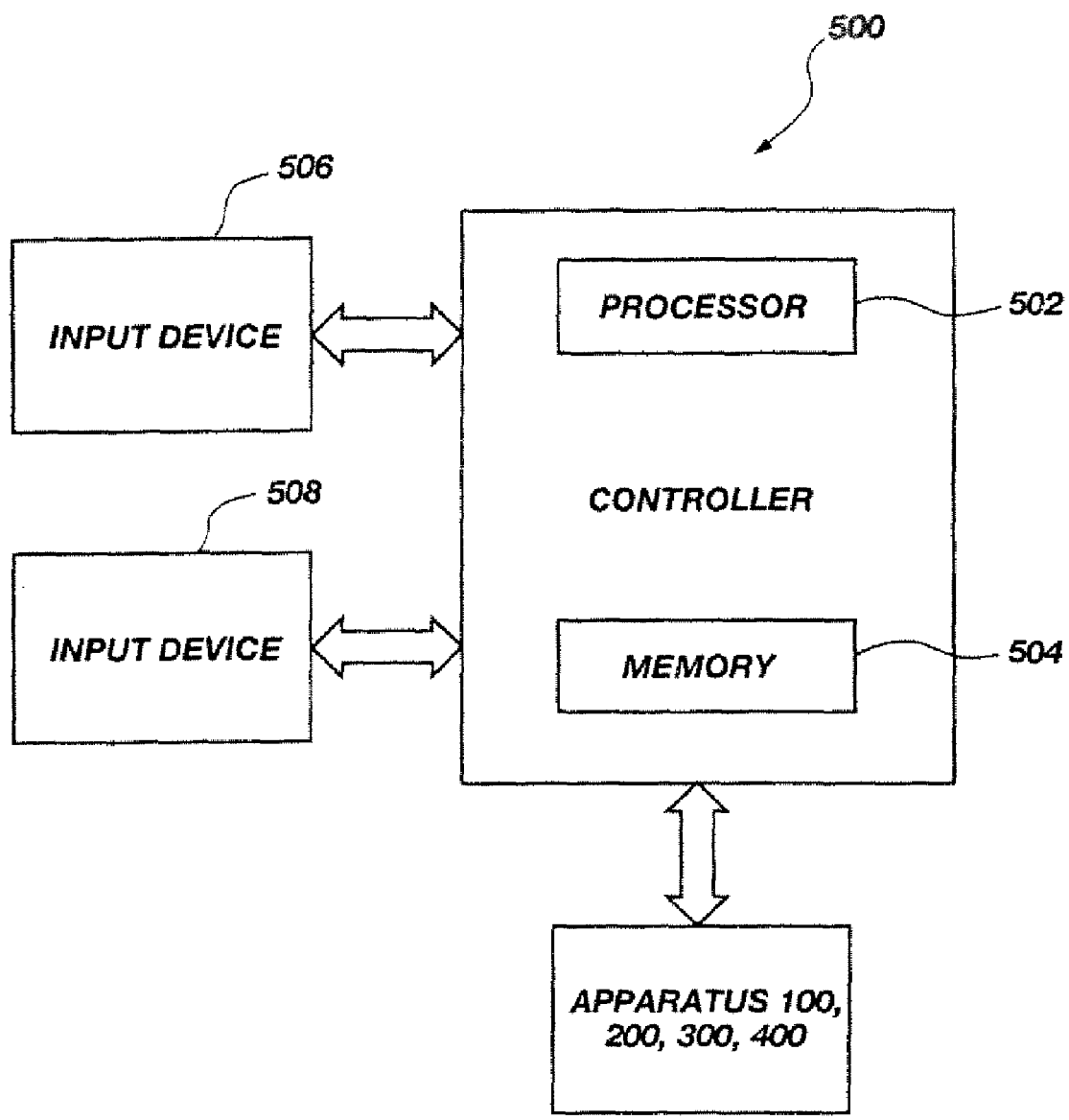
FIG. 11 is a schematic showing the use of a controller with the apparatus for forming elongated composite members in accordance with an embodiment of the present invention.

Referring briefly to FIG. 11, any of the above apparatus may be operatively coupled with a controller 500 which may include, for example, a computer having a processor 502, a memory device 504, one or more input devices 506 and one or more output devices 508. Such a controller 500 may be programmed to the associated apparatus 100, 200, 300 and 400 such as, for example, using computer number control (CNC) programming. The controller 500 may be configured to control the relative positions of for example, the base, the carriage assembly, the gantry, and the roller devices of the various apparatus set forth herein including what may be termed the vertical, yaw, roll, and pitch positions and orientations of the rollers of a given apparatus. The controller 500 may be configured to not only control the vertical position of the roller relative to the mandrel it is intended to engage, but also the amount of pressure or force applied by the roller to the mandrel or plies of material laid thereover. Furthermore, the controller 500 may be configured to control the amount of heat being applied to the mandrel or associated plies of material, the position of the material relative to a mandrel, and the clamping, cutting and starting of material being fed from an automated material dispenser.

Figure 12A:
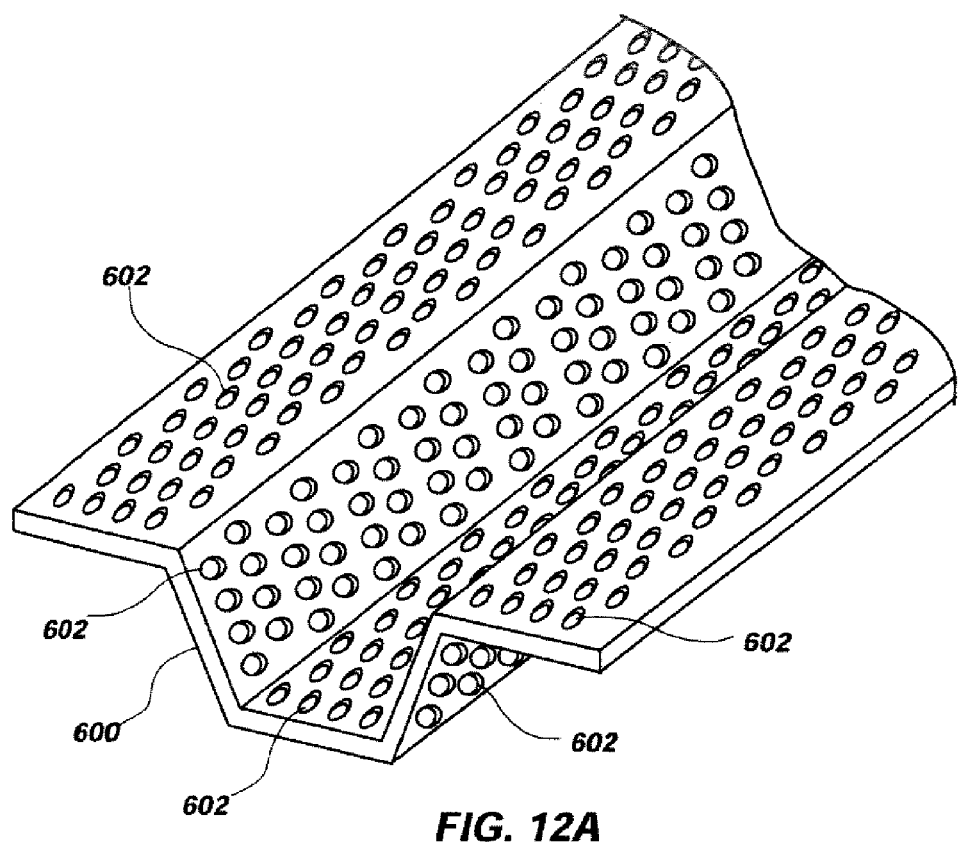
FIG. 12A is a perspective view of a mandrel used in forming an elongated composite member in accordance with an embodiment of the present invention.
Figure 12B:
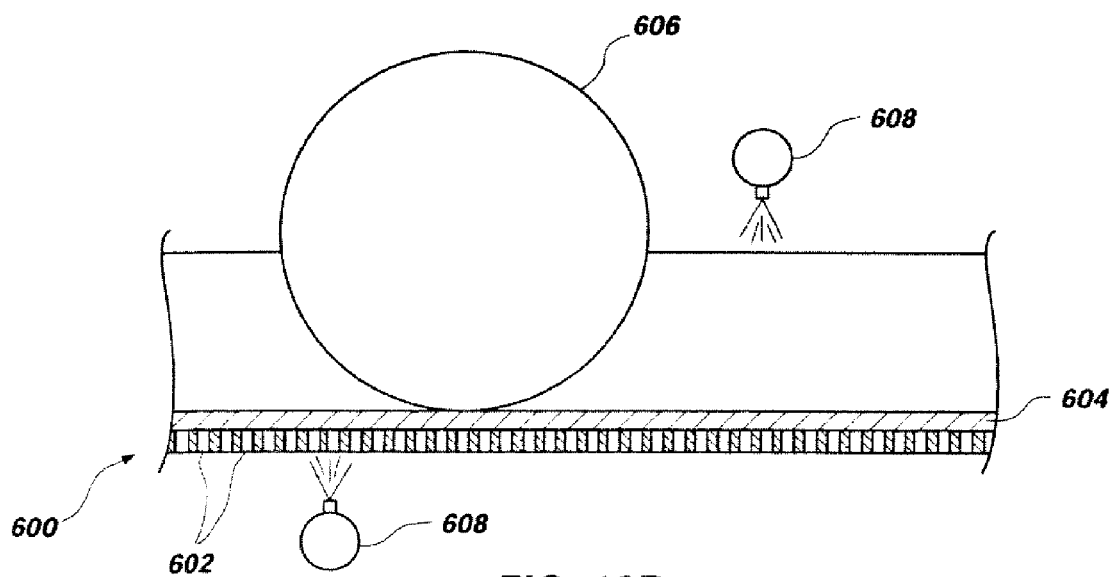
FIG. 12B is a partial cross-sectional side view of the mandrel shown in FIG. 12A during formation of an elongated composite member in accordance with an embodiment of the present invention.

While the above-described embodiments have largely been discussed using the example of individual prepreg materials being laid up on associated mandrels, it is noted that nonimpregnated fiber materials may be utilized with such materials being laid on an associated mandrel while substantially simultaneously infusing or impregnating the plies of material with an appropriate resin or binder. For example, referring now to FIGS. 12A and 12B, a mandrel 600 may be formed as a perforated structure having a plurality of apertures 602 or openings defined therein. As plies of material 604 are laid over the mandrel 600, one or more rollers 606 may complementarily engage the mandrel 600 to form the plies into a desired cross-sectional geometry as described above herein. Additionally, one or more spray nozzles 608 or other deposition devices may infuse resin or binder into the laid up and formed plies to form a shaped, prepreg structure. The resulting elongated member may be partially cured or cured to a B-stage such that the elongated member may be subsequently cocured with an associated composite structure at a later time.

Figure 13A:
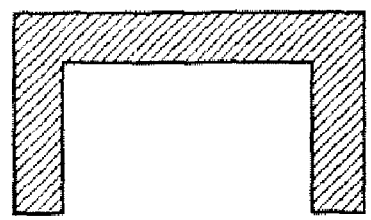
FIGS. 13A-13E are cross-sectional views of exemplary geometric configurations which may be formed in accordance with the present invention.
Figure 13B:
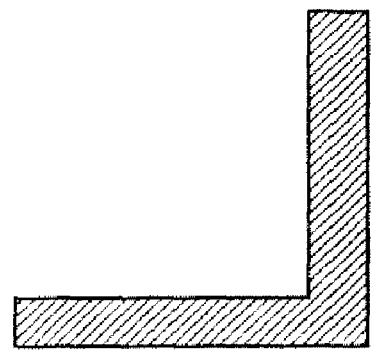
Figure 13C:
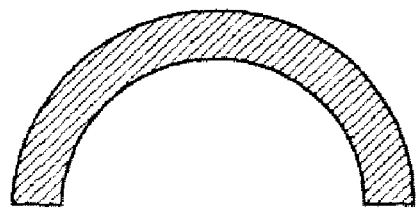
Figure 13D:
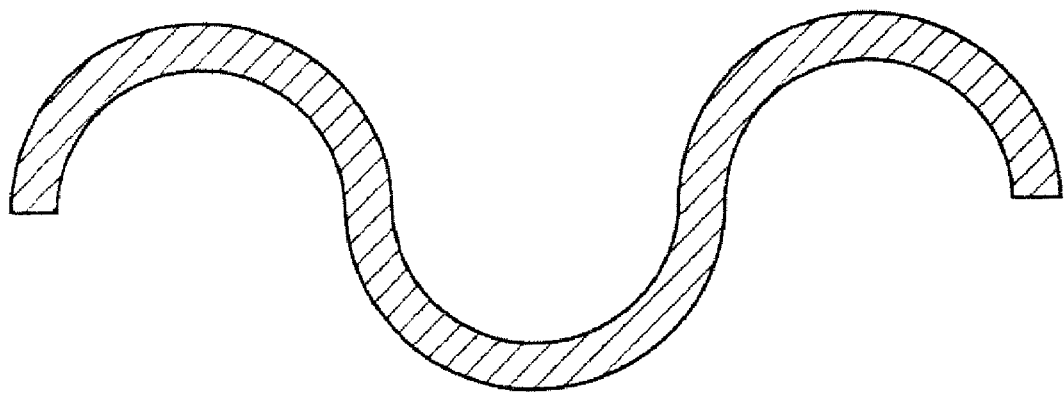
Figure 13E:
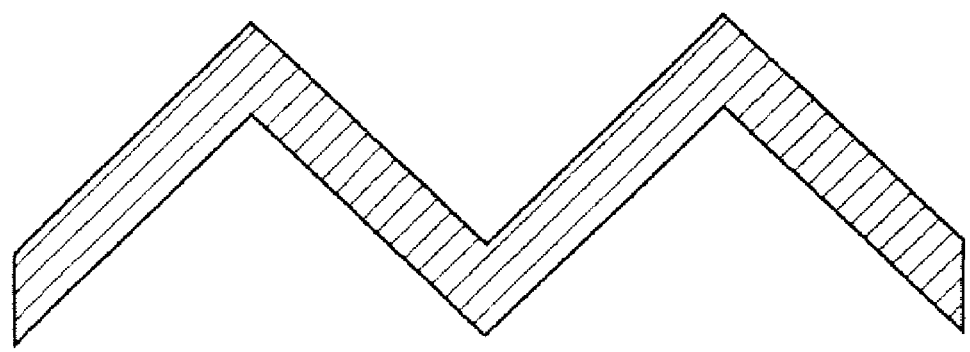

It is noted that the various illustrative embodiments of the invention described above herein have generally shown an exemplary cross-sectional geometry of a hat, or the formation of an elongated member as a hat channel. However, it is contemplated that the present invention may be used to form elongated members of other cross-sectional geometries. For example: at least one C-channel may be formed as illustrated in FIG. 13A; at least one structural angle (or similarly a J-shaped or L-shaped cross-section) may be formed as illustrated in FIG. 13B; a structural member exhibiting at least one arcuate section may be formed as illustrated in FIG. 13C, which may also include flanges to form an omega shape if so desired; a plurality of arcuate shapes may be formed in a single structural member as shown in FIG. 13D; or a plurality of structural angles may be formed in a single structural member as shown in FIG. 13E. Also, various features of such cross-sectional geometries may be combined as desired depending, for example, on the expected loadings such an elongated member will experience.

It is noted that other variations of the present invention are also contemplated. For example, while the exemplary embodiments have been described to include a mandrel and a plurality of complementary rollers, two sets of rollers—an upper set, and a lower set—may be used to form the elongated members. Thus, for example, a plurality of fibers may be passed through an upper female set of rollers and a lower male set of rollers to obtain a desired cross-sectional geometry. However, it is noted that the use of a mandrel, such as in the above-described exemplary embodiments, may provide more precise placement of the plies and control of fiber orientation. Additionally, while various embodiments have been described in terms of utilizing carriage assemblies and gantries, it is further contemplated that robotic arms may be utilized in positioning the rollers and applying appropriate force or pressure to materials disposed over a mandrel. Such a robot may be configured such that the associated roller or rollers are positionable about multiple axes.

Additionally, various materials may be used in forming the elongated structural members. For example composite tape, fabric, dry fabric or various combinations thereof may be used. Furthermore, filler materials may be introduced into the elongated structural member as deemed appropriate. Such filler materials may include, for example, foam, metallic or other nonplastic materials.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming an elongated composite structural member, the method comprising:
   providing a substantially elongated mandrel having an exterior surface exhibiting a desired cross-sectional geometry;
   laying up at least one ply of fiber material preimpregnated with a thermosetting resin on the mandrel; and
   pressing and forming the at least one ply onto the mandrel with a plurality of rollers that are sequentially passed along a length of the mandrel to sequentially press and form the at least one ply on the mandrel, each of the rollers being at least partially complementary in shape with the cross-sectional geometry of the mandrel while maintaining the at least one ply in a substantially uncured state during the pressing and forming, at least one of the rollers that presses and forms the at least one ply onto the mandrel having a ply engaging portion width that is less than a width of the at least one ply.

2. The method according to claim 1, further comprising configuring the plurality of rollers to include a first roller configured and arranged to partially complementarily engage the cross-sectional geometry of the mandrel and a last roller configured and arranged to fully complementarily engage the cross-sectional geometry of the mandrel.

3. The method according claim 1, wherein pressing and forming the at least one ply onto the mandrel further includes forming at least one intermediate structure and a final structure.

4. The method according to claim 3, wherein forming at least one intermediate structure includes forming the at least one ply to partially conform to the exterior surface of the mandrel.

5. The method according to claim 4, wherein forming a final structure includes forming the at least one ply to substantially fully conform to the exterior surface of the mandrel.

6. The method according to claim 1, further comprising forming the mandrel to have a first section extending along a longitudinal axis and a second section which deviates from the longitudinal axis.

7. The method according to claim 1, further comprising coupling the mandrel to a base and coupling at least one roller of the plurality of rollers to a carriage assembly, wherein passing the at least one roller over the mandrel and the at least one ply along a length of the mandrel includes moving the carriage assembly relative to the base.

8. The method according to claim 7, further comprising controlling the movement of the carriage assembly relative to the base with a computer numerically controlled controller.

9. The method according to claim 1, further comprising forming the elongated composite structural member to substantially exhibit a cross-sectional geometry of a hat as taken transverse to a length of the elongated composite structural member.

10. The method according to claim 1, further comprising forming the elongated composite structural member to substantially exhibit a cross-sectional geometry of at least one C-shape as taken transverse to a length of the elongated composite structural member.

11. The method according to claim 1, further comprising forming the elongated composite structural member to substantially exhibit a cross-sectional geometry of at least one angle as taken transverse to a length of the elongated composite structural member.

12. The method according to claim 1, further comprising forming the elongated composite structural member to substantially exhibit a cross-sectional geometry including at least one arcuate section as taken transverse to a length of the elongated composite structural member.

13. The method according to claim 1, wherein pressing the at least one ply onto the mandrel includes consolidating a plurality of plies.

14. The method according to claim 1, further comprising heating at least a portion of the at least one ply prior to pressing the at least one ply onto the mandrel.

15. A method of forming an elongated composite structural member, the method comprising:
laying up at least one ply of composite material onto an elongated mandrel having a surface exhibiting a desired cross-sectional geometry that is configured in more than one plane; and
substantially simultaneously pressing and forming at least a portion of the at least one ply over the mandrel to at least partially conform the at least one ply to the cross-sectional geometry of the mandrel while maintaining the at least one ply in a substantially uncured state by passing at least one roller over a length of the elongated mandrel, the at least one roller at least partially conforming about at least two planes of the cross-sectional geometry of the elongated mandrel, wherein at least one of the at least one roller has a ply engaging portion width that is less than a width of the at least one ply.

16. The method according to claim 15, wherein laying up the at least one layer of composite material includes laying up a plurality of plies of composite material impregnated with a thermosetting resin.

17. The method according to claim 15, further comprising infusing at least one of a thermosetting resin and a binder into the at least one ply.

18. The method according to claim 17, wherein infusing at least one of a thermosetting resin and a binder into the at least one ply is effected substantially simultaneously with the laying up the at least one ply.

19. The method according to claim 17, wherein infusing at least one of a thermosetting resin and a binder into the plurality of plies is effected after the laying up the at least one ply.

20. The method according to claim 17, wherein infusing a thermosetting resin into the at least one ply includes forming the mandrel to define a plurality of apertures therein and spraying the thermosetting resin through the plurality of apertures.

21. The method according to claim 15, wherein passing the at least one roller over the length of the mandrel includes sequentially passing a plurality of rollers over the length of the mandrel.

22. The method according to claim 17, further comprising configuring and arranging the plurality of rollers such that a first roller of the plurality of rollers partially complementarily engages the mandrel and a last roller of the plurality of rollers substantially fully complementarily engages the mandrel.

23. The method according to claim 15, further comprising coupling the mandrel to a base and coupling the at least one roller to a carriage assembly, wherein passing the at least one roller over the length of the mandrel includes moving the carriage assembly relative to the base.

24. The method according to claim 19, further comprising controlling the movement of the carriage assembly relative to the base with a computer numerically controlled controller.

25. The method according claim 15, wherein substantially simultaneously pressing and forming a portion of the at least one ply further includes forming the elongated composite structural member as at least one intermediate structure and as a final structure.

26. The method according to claim 21, wherein forming at least one intermediate structure includes forming the at least one ply to partially conform to an exterior surface of the mandrel.

27. The method according to claim 22, wherein forming a final structure includes forming the at least one ply to substantially fully conform to the exterior surface of the mandrel.

28. The method according to claim 15, further comprising forming the mandrel to have a first section along a longitudinal axis and a second section which deviates from the longitudinal axis.

29. The method according to claim 15, further comprising forming the elongated composite structural member to substantially exhibit a cross-sectional geometry of a hat as taken transverse to a length of the elongated composite structural member.

30. The method according to claim 15, further comprising forming the elongated composite structural member to substantially exhibit a cross-sectional geometry of at least one C-shape as taken transverse to a length of the elongated composite structural member.

31. The method according to claim 15, further comprising forming the elongated composite structural member to substantially exhibit a cross-sectional geometry of at least one angle as taken transverse to a length of the elongated composite structural member.

32. The method according to claim 15, further comprising forming the elongated composite structural member to substantially exhibit a cross-sectional geometry including at least one arcuate section as taken transverse to a length of the elongated composite structural member.

33. The method according to claim 15, further comprising heating the portion of the at least one ply.

\* \* \* \* \*